United States Patent [19]

Terry et al.

[11] Patent Number: 5,184,138

[45] Date of Patent: Feb. 2, 1993

[54] DATA DISTRIBUTION NETWORK

[75] Inventors: James W. Terry, Plano, Tex.; John P. Rasmussen, Clinton, Ohio

[73] Assignee: The United States of America as represented by the Secretary of the Air Force, Washington, D.C.

[21] Appl. No.: 67,578

[22] Filed: May 22, 1987

[51] Int. Cl.⁵ .............................................. G01S 7/44
[52] U.S. Cl. ...................................... 342/195; 342/20; 364/517
[58] Field of Search ........................... 342/20, 195, 13; 364/200 MS File, 900 MS File, 517

[56] References Cited

U.S. PATENT DOCUMENTS

| | | | |
|---|---|---|---|
| 3,399,404 | 8/1968 | Githens et al. | 342/195 |
| 3,603,989 | 9/1971 | Caspers | 342/195 |
| 3,725,923 | 4/1973 | Bosc et al. | 342/107 |
| 3,879,727 | 4/1975 | East | 342/195 X |
| 3,885,224 | 5/1975 | Klahr | 342/254 |
| 3,891,987 | 6/1975 | Jensen | 342/106 |
| 4,290,105 | 9/1981 | Cichelli et al. | 364/200 |
| 4,295,124 | 10/1981 | Roybal | 340/347 DD |

Primary Examiner—Gilberto Barrón, Jr.
Attorney, Agent, or Firm—Bernard E. Franz; Donald J. Singer

[57] ABSTRACT

The data distribution network (DDN) improves processing throughputs (eight million bytes per second) whenever high data rates of unsorted data are input to a processing system by combining synethetic (hash) addresses with look-up tables. The DDN includes coarse steering logic, fine steering logic, and assignment logic for partially sorting and filtering data so that subsequent analysis procedures can find the data in a more orderly form. This increase the pulse density handling capability of a processing system without major size and weight impact.

2 Claims, 9 Drawing Sheets

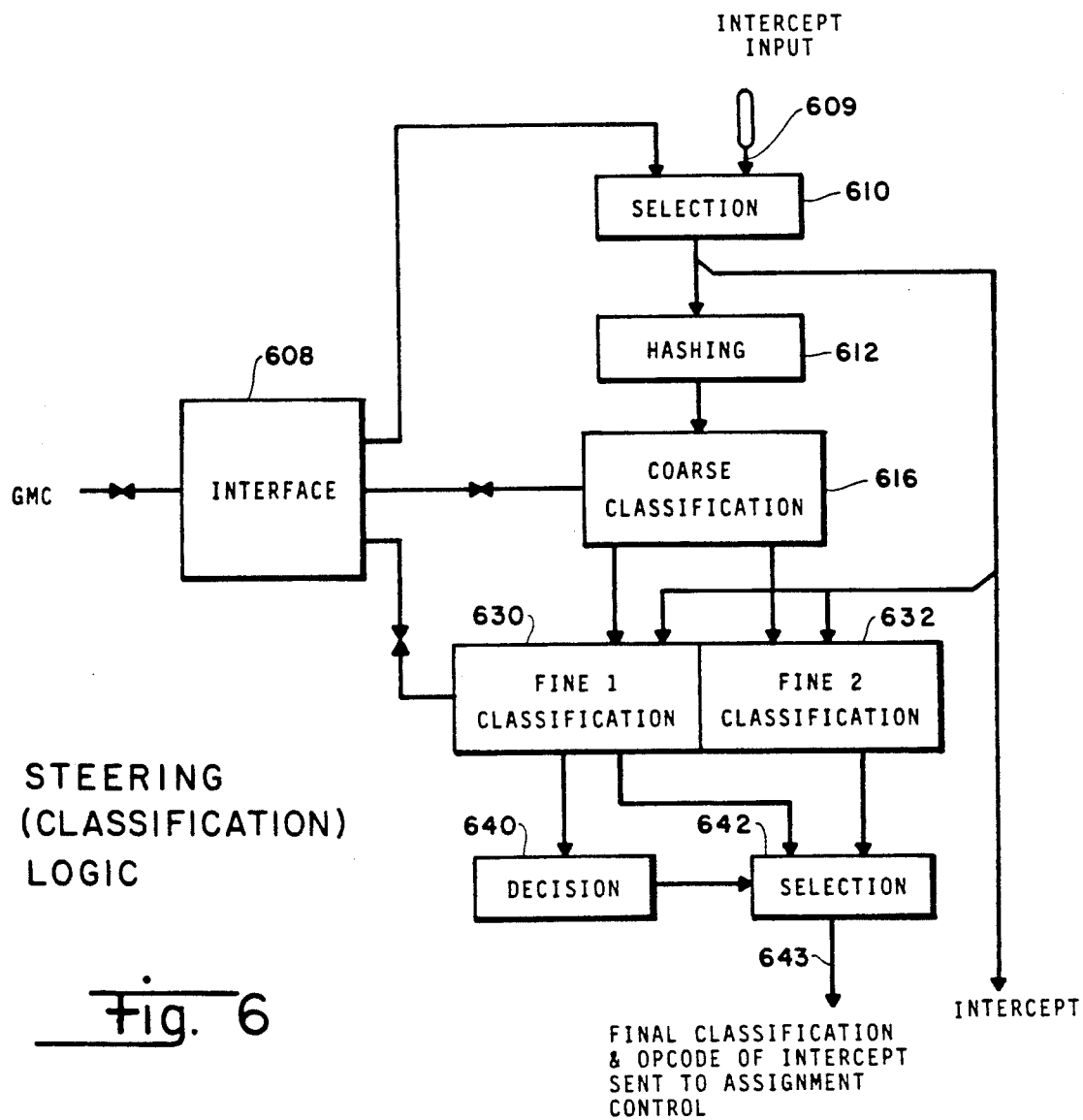
Fig. 6
STEERING (CLASSIFICATION) LOGIC
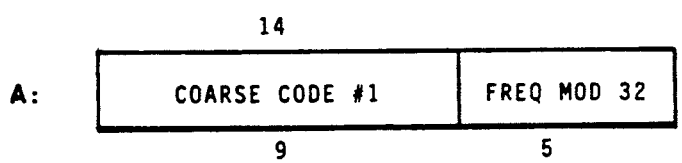
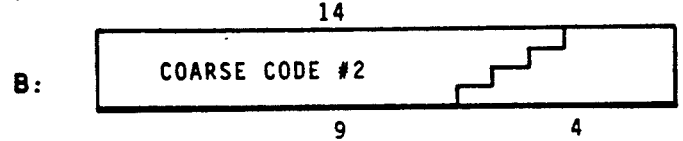
Fig. 13
FINE CLASSIFICATION OUTPUT

ASSIGNMENT BLOCK DIAGRAM

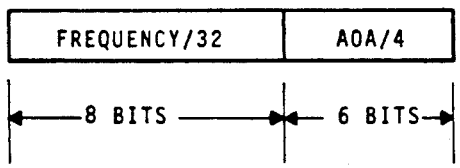
Fig. 8 COARSE HASHING
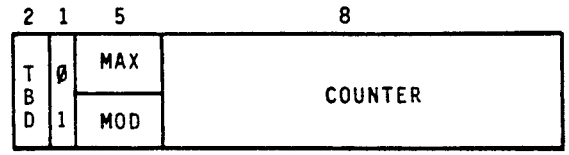
Fig. 9 COUNT MEMORY FORMAT
LIMITING COUNTER: WILL COUNT TO MAX *8
MODULO COUNTER: WILL ROLL OVER @ MOD *8
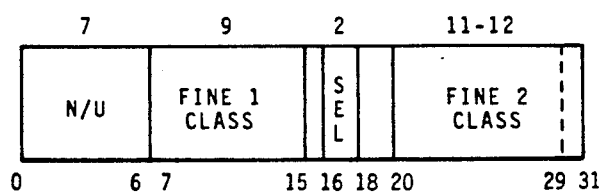
Fig. 10 COARSE CLASSIFICATION OUTPUT
| 12 | 10 | 10 |
|---|---|---|
| CNTR # | GMA/w | |
| CNTR # | GMA/2048 | REP LINK |
| CNTR # | POSP SEED | NEXT SEEDLINK |
| PE # | ME LINK | CONT LINK |
Fig. 11 ASSIGNMENT FORMATS
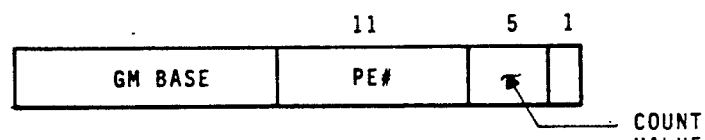
Fig. 12 OP CODE 4 DEFINITION

FORMAT OF FINE 1
FINE CLASSIFICATION MEMORY

COUNT MEMORY
CIRCUITRY

DATA DISTRIBUTION NETWORK

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a data distribution network (DDN). and more particularly to a an electronic warfare data distribution network such as a radar warning system. A possible non-military application of the DDN might be a large inventory system.

The importance of electronic warfare (EW) to the effectiveness of armed forces has become increasingly evident. This effectiveness must be maintained in the face of a growing increase in the radar environment density and technical sophistication of radar systems of potential enemies. In addition, infrared (IR) and laser systems are coming into use. These trends have resulted in particularly severe requirements on EW data processing. The data processing system must not only have much greater capacity, but it must be capable of executing a much more sophisticated set of algorithms than at any time in the past.

The EW processing is complicated by very high input data rates with much lower information content. Therefore, this input data must be processed to remove redundant information. The resulting data must then be further processed to derive information which can be used for self-protection of the platform. The processing involves highly flexible search and arithmetic operations on multiple data. Such operations are ideally suited to associative type processing.

The purpose of a project related to the subject invention was to determine if the very severe EW data processing requirements could be met or alleviated through proper application of parallel processing architectures. In particular, the single instruction multiple data stream type (SIMD), often referred to as associative processors was to be evaluated. In fact, the utility of associative processing techniques for EW applications was recognized during studies performed for the U.S. Air Force in the late sixties and early seventies. However, the state of the art in integrated circuit technology at that time could not provide associative processors with adequate capability to in the required package size to meet the demanding EW requirements. Consequently the existing requirements were met with a special hardwired associative type memory in the preprocessor section of the Microcomputer Array processor System MAPS) which was developed (See report AFAL-TR-78-157, titled "Microcomputer Array Processor" published by DTIC as number AD-A070 848). Now the IC technology has advanced to the level that the more flexible and capable associative processor organizations are feasible for EW applications. For example, a mil-standard airborne SIMD processor called ASPRO has been produced, and is used in the E-2C Aircraft.

A preprocessor in the Microcomputer Array processor System includes hardware to accept digitized radar pulse intercepts outputted by a receiver and correlate each intercept against an established emitter file for pulse train tracking and data filtering operations. The objective is to reduce the data rate into the multiprocessor by filtering, from the input pulse stream, those intercepts that originate from emitters which are currently being tracked by the preprocessor. This data rate reduction is essential to allow handling of a very high receiver data rate while still maintaining sufficient processing time per radar intercept in the multiprocessor to execute complex PRI (Pulse Repetition Interval) establishment algorithms. The filtering via correlation operation consists of comparing the parameters of each intercept pulse against the parameters of the emitter words stored in the preprocessor memory. Hardware hash addressing techniques are used to select that subset of the emitter file over which a particular correlation operation could be meaningful. If the intercept matches the emitter word within predetermined tolerances for each selected parameter, correlation is said to occur.

A system designed by LORAL include a preprocessor which forms a 13-bit hash address on frequency and AOA to use as a pointer to a cluster map. The cluster map, of necessity, has 8,192 ($2^{13}$) entries. This map contains a pointer to the cluster track file if it is an entry to be updated. If the cluster map address is a null entry (not in track file) the preprocessor either forms a new cluster and appropriately updates the cluster map pointer or it extends an existing cluster and points to it. There are a maximum of 63 pulses per cluster. This would all be done in combinational logic.

U.S. patents of interest include U.S. Pat. No. 3,725,923 to Bosc et al, which discloses incoherent digital pulse doppler radar system with improved signal handling capacity which reduces the number of target signals which must be processed; U.S. Pat. No. 3,891,987 to Jensen, which discloses a data processing system for radar wherein all stored target information is instantaneously and continuously analyzed and displayed; and U.S. Pat. No. 3,885,224 to Klahr, which discloses a high-speed signal processing apparatus for mathematical processing of a sequence of pulse signal time functions.

SUMMARY OF THE INVENTION

An object of the invention is to provide for an increase of pulse density handling capability of a processing system without major size and weight impact.

The invention is directed to a data distribution network (DDN) which improves processing throughputs (eight million bytes per second) whenever high data rates of unsorted data are input to a processing system by combining synthetic (hash) addresses with look-up tables. The DDN includes coarse steering logic, fine steering logic, and assignment logic for partially sorting and filtering data so that subsequent analysis procedures can find the data in a more orderly form.

BRIEF DESCRIPTION OF THE DRAWING

FIG. 6 is a block diagram of the steering (classification) logic hardware;

FIG. 8 is diagram showing bit assignment for course hashing;

FIG. 9 is diagram showing bit assignment for the count memory format;

FIG. 10 is diagram showing bit assignment for course classification output;

FIG. 11 is diagram showing bit assignment for assignment formats;

FIG. 12 is diagram showing bit assignment for OP code 4 definition;

FIG. 13 is diagram showing bit assignment for fine clasification outputs;

DETAILED DESCRIPTION

The invention is disclosed in a technical report AFWAL-TR-84-1061, titled "Electronic Warfare Applications of Associative Processors (EWAP)" which is included in the Defense Technical Information Center (DTIC) collection of documents as number AD-C953 151. A copy of the report (except for classified portions) is included with the application as filed. Reference is made in the above report to another technical report AFAL-TR-78-157, titled "Microcomputer Array Processor" published by DTIC as number AD-A070 848, a microfiche copy of which is included with the application as filed. The Microcomputer Array Processor System (MAPS) is now called MAPP (Modular Adaptive Parallel Processor).

The EWAP program described in the report AFWAL-TR- 84-1061 had as its purpose to determine if the very severe EW data processing requirements could be met or alleviated through proper application of parallel processing architectures.

The emphasis with the design was placed on solving the severe RF preprocessing problem. The IR preprocessing capability was determined to be a "fall out" of providing RF preprocessing.

Figure 1:
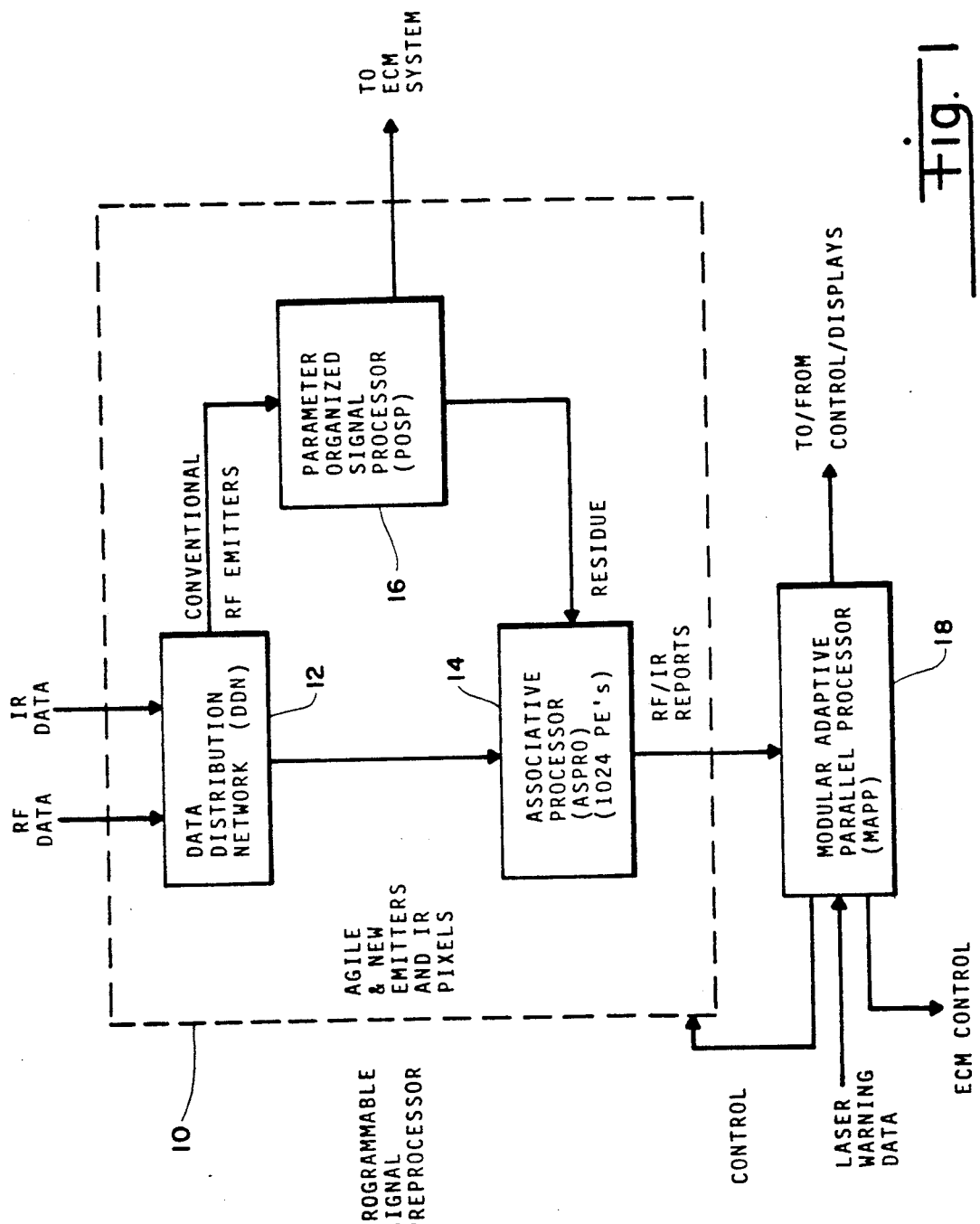
FIG. 1 is a system block diagram of a the processing system for Electronic Warfare Applications of Associative Processors (EWAP)

The recommended system is composed of many subsystems. A block diagram of the EWAP system is shown in FIG. 1. A programmable signal preprocessor 10 comprises a data distribution network (DDN) 10, an associative processor (ASPRO) 14, and a parameter organized signal processor (POSP) 16. The system also includes a modular adaptive parallel processor (MAPP) 18. Inputs to the data distribution network 12 are digital pulse streams comprising RF data from an intercept receiver and IR data from an infrared sensor. Outputs from the DDN 12 include data relating to agile and new emitters and IR pixels supplied to the associative processor 14, and conventional RF emitter data supplied to the signal processor 16. Output from the signal processor 16 is supplied to an ECM system. RF/IR report digital data from the associative processor 14 is supplied to the parallel processor 18. The parallel processor 18 also has laser warning data input, control output to the signal preprocessor 10 and to the ECM system, and coupling to and from control and display units.

The data distribution network (DDN) 10 shown in FIG. 1 is in effect a very large table. The table is addressed on the basis of the frequency, angle of arrival (AOA), and pulse width (PW) of incoming data. The table entries are filled based on previous detections within the frequency/AOA/PW resolution cells. The entries are used to direct incoming pulses to either the parameter organized signal processor 16, the associative processor 14, or (if desired) directly to the parallel processor 18. The use of the DDN 12 in this way gives maximum flexibility to optimally use the assets and to reconfigure in case of failure.

The parameter organized signal processor 16 filters out pulse words from previously detected stable frequency, stable pulse repetition interval (PRI) emitters, while sending the residue to the associative processor 14, It also passes pulse words from emitters being jammed to the ECM system. The associative processor 14 is used to process pulse words from previously detected agile emitters (either frequency or PRI) and to generate new emitter reports (conventional and agile). The very large percentage of such emitters anticipated in the 1990's combined with their level of sophistication provides the impetus for this approach since high data rate capability and flexible/ powerful algorithms will be essential. The associative processor 14 also performs the preprocessing function for IR arrays, performs emitter identification, and emitter track file maintenance.

The parallel processor 18 is then used to do further processing on reports from newly established emitters, and pixels which exceed threshold after filtering in the associative processor 14. It also provides the control function for the other processors. In addition, it performs the sensor data fusion function among the IR array and IR laser warning systems, the ECM system, controls and displays, and any other information sources available. The associative processor 14 augments the parallel processor 18 for these functions.

Figure 2:
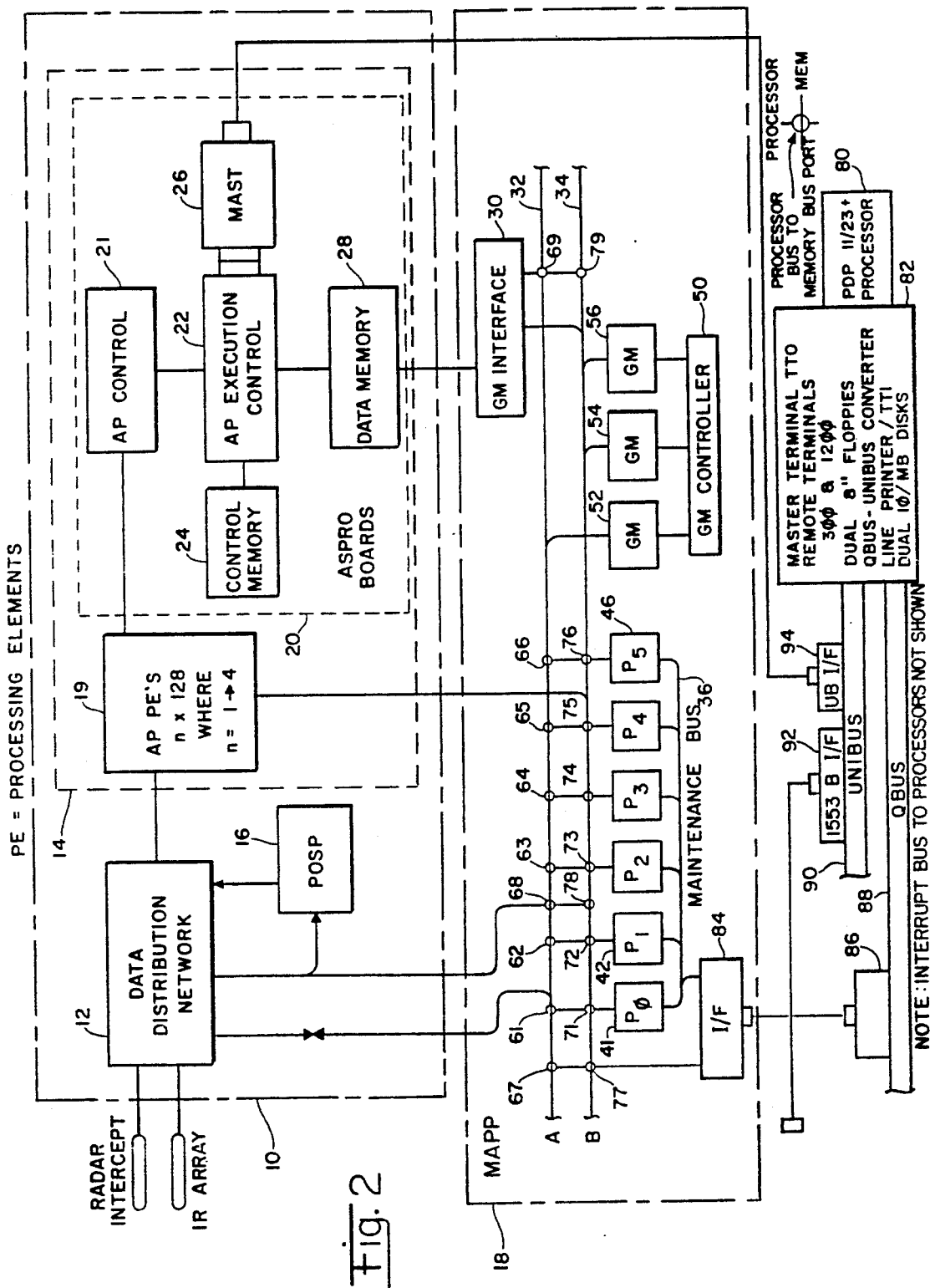
FIG. 2 is a more detailed system block.

FIG. 2 is a more detailed system block diagram. It shows the data distribution network 12, the parallel organized signal processor (POSP) 16, the associative processor (AP) 14, multiprocessors 41-46, global memory 52, 54, 56, and the host processor portion of the system. The host processor 80 is a PDP-11/23 plus system used for operator control, display, and software development. It has the following options and peripherals 82 attached:

2—removable media 10 MByte hard disks
2—8" floppy drives
1—video terminal
1—hard copy terminal
1—4-way modern control interface
1—QBUS/UNIBUS converter interface
1—interface to multiprocessor system
1—interface to parallel processor subsystem The data distribution network (DDN) 12 massages the incoming intercept data. It is a high-speed sort network that uses hashing and look-up tables to determine the subsystem that will ultimately process the data: MAPP 18, POSP 16, or the AP 14. It also can limit the number of intercepts processed within a given class and can decide on the addresses within a subsystem where the intercept will be sorted prior to processing.

The POSP 16 is a parameter organized signal preprocessor primarily used to track previously detected stable emitters. The POSP operation is fully described in report AFAL-TR-78-157 dated October 1978 (in Section II—THE PREPROCESSOR); and the hardware is described herein below.

A MAPP multiprocessor was also a topic in the above report (in Section III—THE MULTIPROCESSOR) As shown in FIG. 2, the MAPP 18 includes six of those 32-bit processors 41-46, which are configured in this system to communicate with global memory 52, 54, 56 over two main data busses 32 & 34. These data busses are the mean whereby the rest of the system is integrated and controlled.

The associative processor (AP) 14 is an ASPRO processor with a modifcation to the processing elements (PE) board 19 for enhanced I/O rates. An unmodified ASPRO has burst I/O rates of about 1 MByte/sec for 32 or more PEs, while the enhancement has a burst I/O rate of more than 125 KBytes/sec/PE. The AP 14 is used to perform agile emitter track processing as well as classification and detection of "new" emitters. (Note: I/O rates given relate to those given under full control of the ASPRO execution control unit.) The enhancement is capable of continuous I/O in the range of 16 MBytes/sec.

Figure 3:
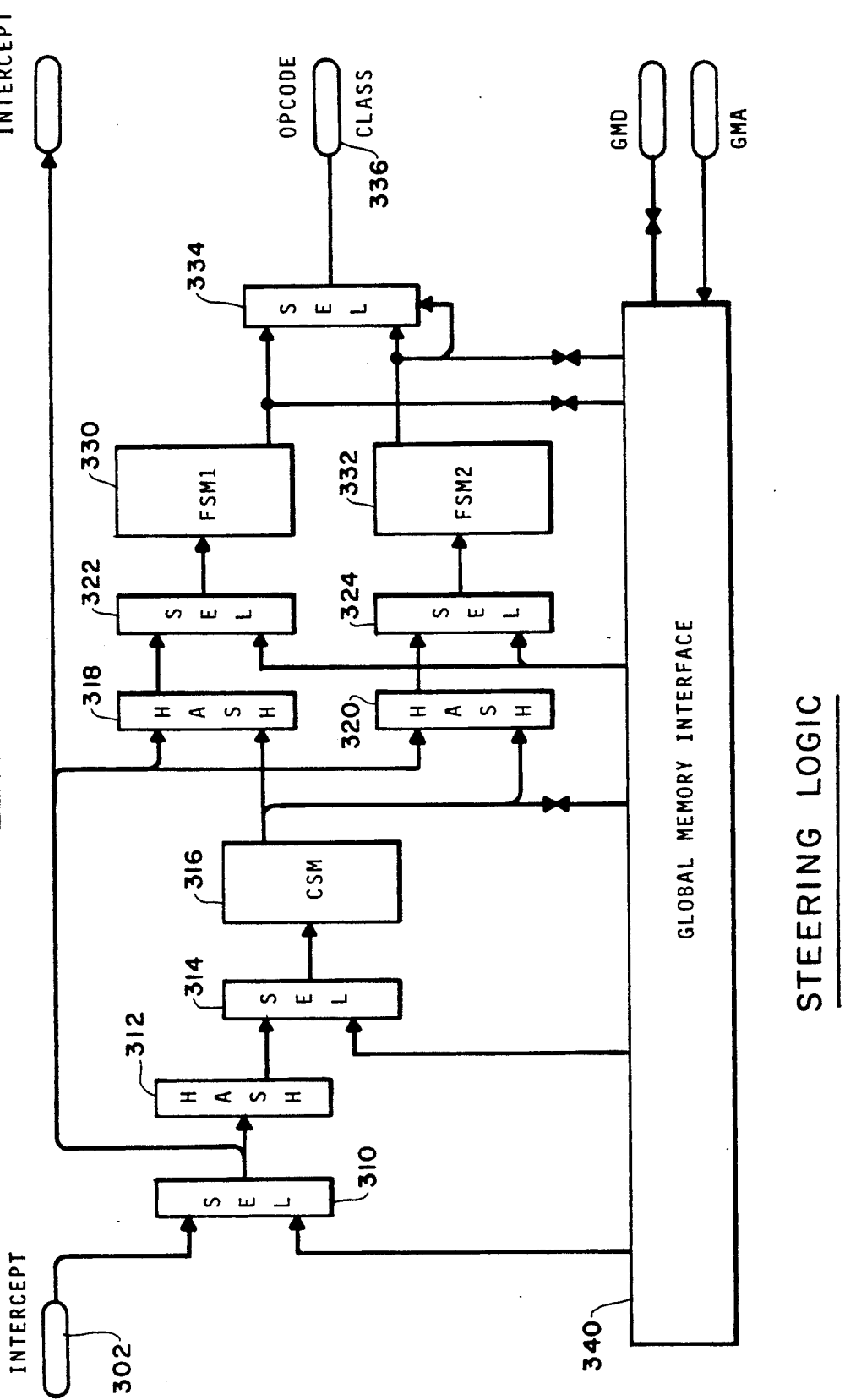
FIG. 3 is a diagram showing the steering logic.
Figure 4:
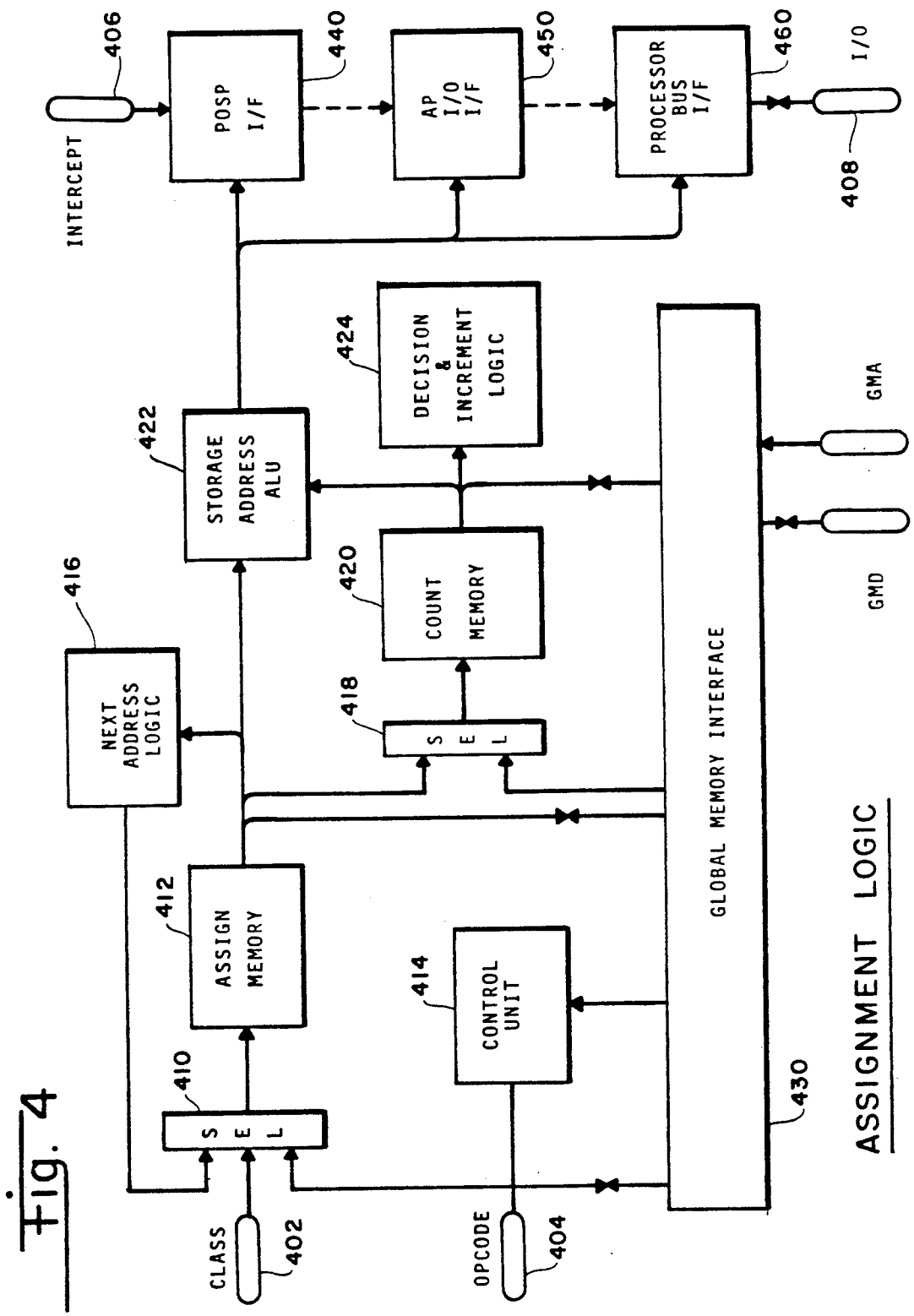
FIG. 4 is a diagram showing the assignment logic.
Figure 7:
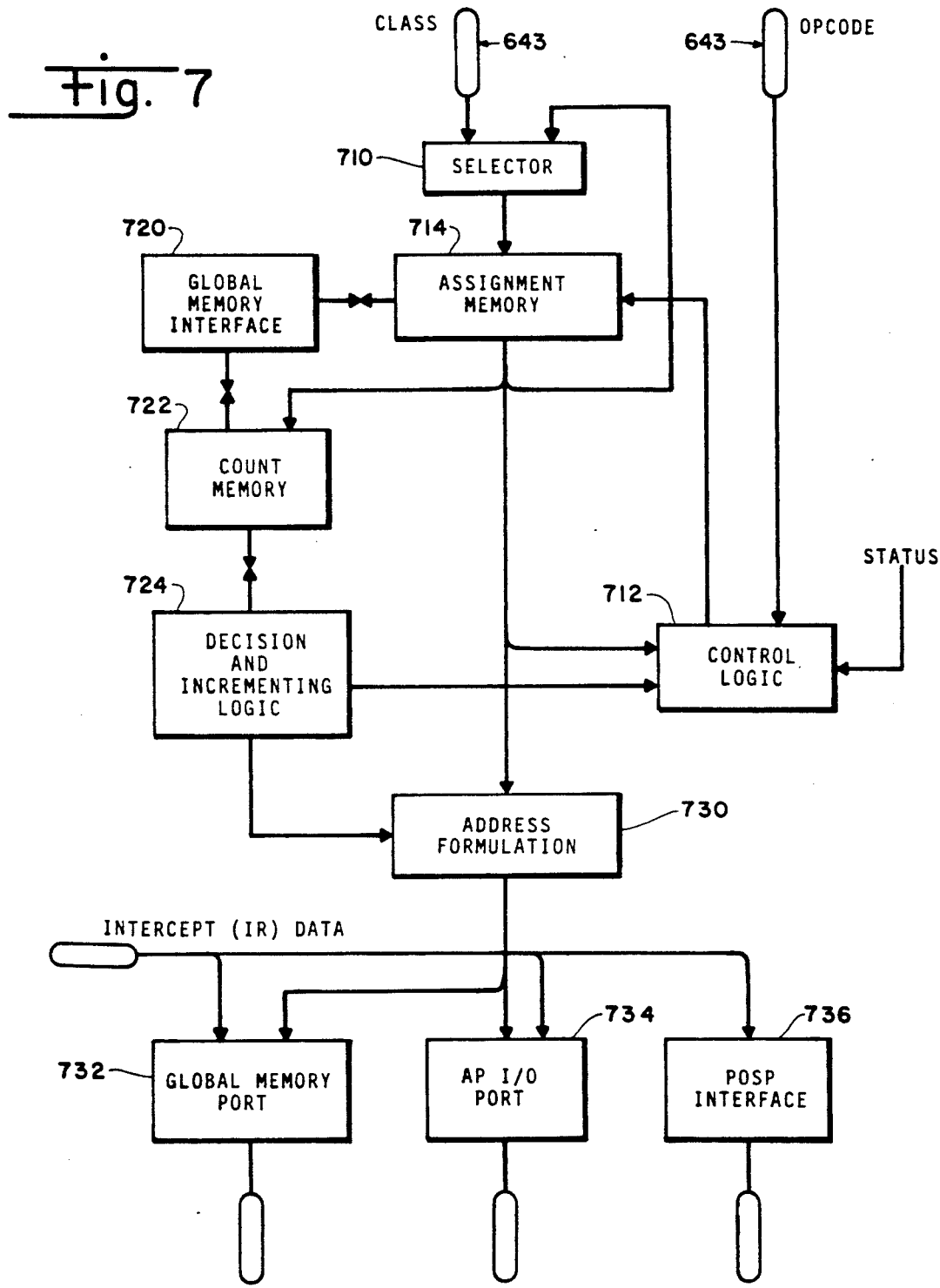
FIG. 7 is a block diagram of the assignment logic hardware.

The data distribution network DDN) 12 includes coarse steering logic and fine steering logic shown in FIGS. 3 and 6, and assignment logic shown in FIGS. 4 and 7 for partially sorting and filtering data so that subsequent analysis procedures can find the data in a more orderly form.

STEERING AND ASSIGNMENT LOGIC

FIG. 3 shows the block diagram of the steering logic. Radar intercepts arrive at the input 302 to the steering and assignment logic in the order that they are detected by the receiver. The logic is designed to partially sort and filter this data so that the subsequent analysis procedures can find this data in a more orderly form.

The sorting technique used is hash addressing, but this is accomplished on two levels to reduce the amount of hardware required. Coarse hashing uses 14 of the 64 available intercept bits to decide to which of 16,384 bins the intercept belongs. The 16K bins are too many for downstream filtering to handle, hence, they are reduced to 1K bins for input to the fine steering memory 312, 314 and 316.

The fine steering memory 322, 324, 330 and 332 accepts the reduced classification output from the coarse steering memory and adds to it some more raw data from the intercept word 318, and 320. Fine steering actually performs two sorts on the intercept and uses the result of one sort to decide at unit 334 which of the two sort outputs will be used. The final sort output 336 contains the class number or the intercepts and the operation that will be performed in the assignment portion of the logic.

A block diagram of the assignment logic is shown in FIG. 4. The assignment logic produces the address of the final storage location for the intercept in one of the intercept's possible destinations, i.e., global memory 460, POSP 440, or the AP I/O buffer 450. The logic also provides the environment filter that cuts off further processing of the signal if a count within a given class of intercepts has exceed a programmable upper limit. This technique doesn't reduce the burden on the receiver, but can substantially reduce processing loads and storage requirements in the system.

AP I/O Buffer—Global Memory

The GMB is directly attached to a second 32-bit port of the AP I/O buffer. A direct connection is made from each card to the GMB in terms of data and address. Timing information is dependent on the other two active system busses Array and Array I/O and the bus resolver.

Figure 5:
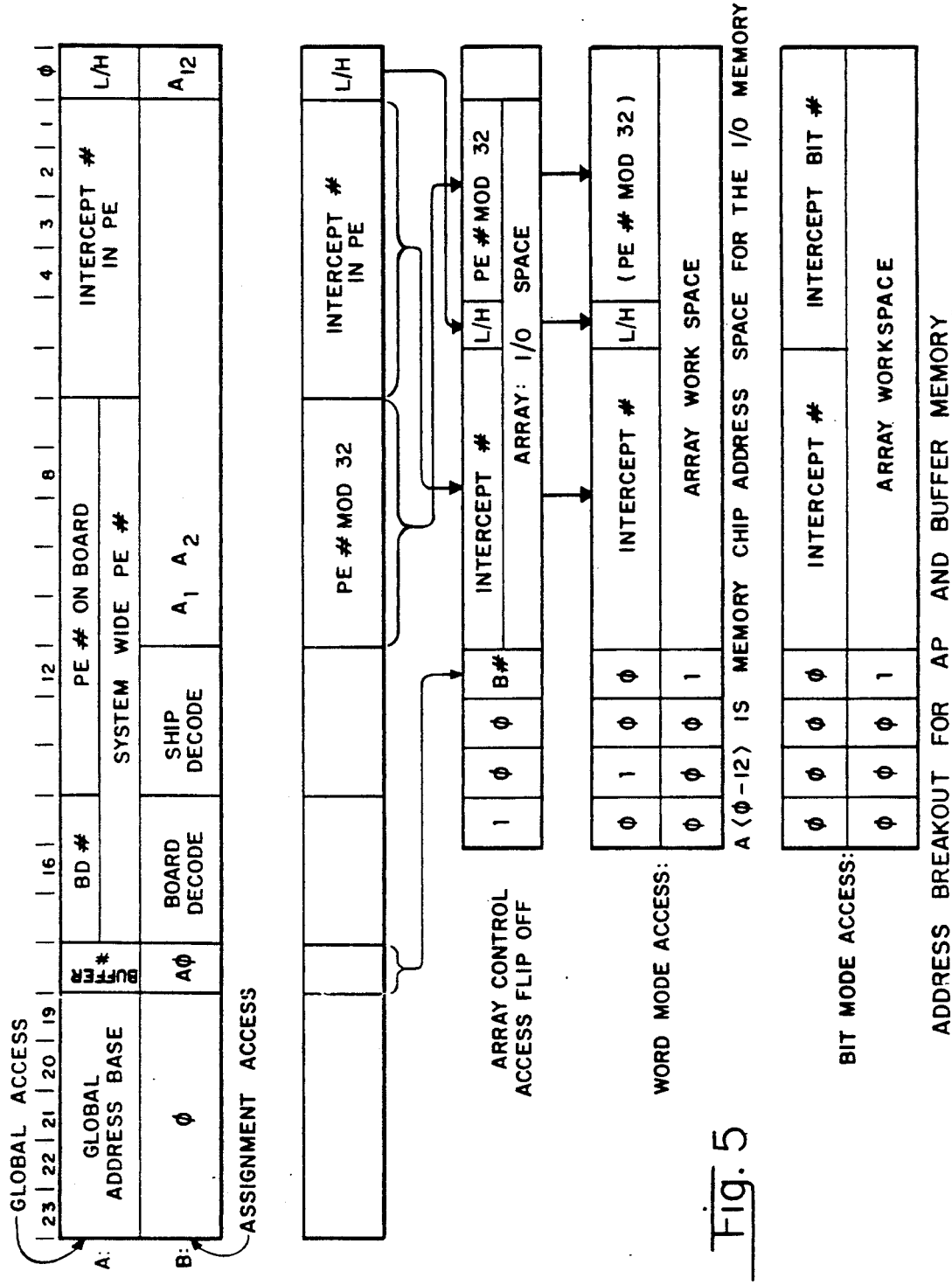
FIG. 5 is a diagram showing the address breakout for the associative processor AP and the buffer memory.

FIG. 5 shows the address breakout for AP and buffer memory.

Hardware

Sorting and routing sensor inputs is the primary purpose for the steering assignment logic. FIG. 6 shows the functional blocks needed by the steering portion of the system, and FIG. 7 the assignment portion.

The diagrams in the above-mentioned figures are meant to show functionally what is needed without being specific about the actual implementation. The following items describe the functions shown in the figures.

Selector

The selection network 610 at the top of FIG. 6 shows that intercept, or simulated data can be used to drive the steering unit. Intercept data is multiplexed over a 32-bit wide channel 609 and packed internally into a 64-bit wide word (610, 612). Simulated data is sent over a 32-bit wide path (MB) (608 to 610) and used to replace either of the above sensor inputs.

Hashing

The data inputs are selectively used to formulate an address that is used to access a 32-bit memory 616. Hashing for the intercept word is shown in FIG. 8. Hashing for simulated data would be similar. Hashing hardware 612 would be nothing more than a selector.

Coarse Classification (Steering)

Coarse classification in unit 616 is used as a means of collapsing the memory requirement. If, for example, we really needed to hash over 19 bits instead of 14, a 19-bit hashing approach would have required a 1.0 MByte memory that would be expensive in fast static RAM technology. Coarse followed by fine classification memories 330 & 332 as described reduce the memory requirement to (1*4*16K)+(2*16K*2)=128 KBytes or one-eighth of the RAM requirement. The 14 bits of original hash is reduced to 9 or 10 bits of classification heading. Resolution can be maintained in certain areas at the expense of resolution elsewhere.

The output of the coarse classification memory 616 is shown in FIG. 10. The upper seven bits (0-6) are not used; bits (7-15) provide the Fine 1 class code: Bits (16-17) provide a selector code for choosing the remaining hash bits for Fine 1, Bits (18-19) choose the precision of the Fine 2 class as 9, 10, 11, or 12 bits and, of course also choose the number of hash bits added as 5, 4, 3 or 2, respectively.

Fine Classification

The coarse classification code (9 or 10 bits) is passed on to another memory 630 or 632 in which the coarse classification is combined with more bits of the actual intercept word as shown in FIG. 13.

Address format A is used to drive Fine 1. Fine 1 is the fine steering memory 630 generally used for POSP steering and also as the decision memory that decides whether Fine 1 or Fine 2 provides the final classification code to the assignment logic. Fine 2 uses format B for its address and this memory 632 is used for items that may go to the AP for processing.

Figure 14:
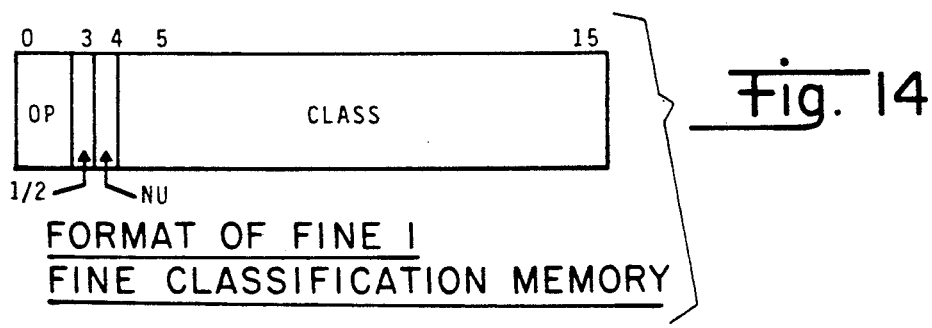
FIG. 14 is diagram showing bit assignment for the format of FINE 1 fine classification memory.

Fine 1 output format is shown in FIG. 14. A decision block uses bit 3 from the output of memory 630 to control a selection unit 642. If bit 3 is set, the output of Fine 1 memory 630 is chosen to pass on to the assignment logic and if reset, then the output of Fine 2 memory 632 is chosen. The output of the selection unit 642 is forwarded via line 643 to the assignment logic of FIG. 7, with the two lines for the OP code going to control logic 712, and the class data going via a selector unit 710 to the assignment memory 714.

The final sort classification is one of 2048 and the disposition of that intercept is chosen by the OP code in bits (0-2). OP code formats are shown in the following table.

| OP Code | OP CODE FORMATS<br>Intercept Destination or Routing |
|---------|-----------------------------------------------------|
| 0       | Global Memory                                        |
| 1       | POSP if fail then Global Memory                      |
| 2       | Array I/O Buffer and GM for Tagging                  |
| 3       | GM and GM for Tagging                                |
| 4       | (Spare)                                              |
| 5       | (Spare)                                              |
| 6       | (Spare)                                              |
| 7       | (Spare)                                              |

Assignment Logic

The assignment memory 714 is addressed in state 0 using the class code obtained from the steering memories as address with the upper address bits held to zero. The format of the assignment memory entry is dependent upon the OP code. The formats are shown in FIG. 11 and discussed below.

OP Code 0: The output of the assignment meory (AM) is used to steer the intercept to global memory (GM) starting at (GMA+(Count)*2). The accessed counter is incremented if it did not exceed the max count value. Format 1 is used.

The net effect of this OP Code is to partially hash sort the intercept data and store in global memory in the order of receipt.

OP Code 1: The intercept belongs to a resolution cell containing emitters and is presented to the POSP for further analysis. Format 3 is used for this. The seed field defines where the POSP is to begin its search within its emitter field.

OP Code 2: The intercept belongs to a resolution cell containing an agile emitter. It is sent directly to the AP I/O buffer. If replication is performed then a copy is also sent to the Time-Ordered buffer kept in global memory. Replication is signalled by a non-zero value in the "ME-LINK" portion of the assignment word. If the class of intercepts is expected to exceed the maximum storage capacity of 32 intercepts/PE then a non-zero value is stored in the "C-LINK" field as well.

OP Code 3: The intercept may be a candidate for ECM or other special handling and is sent to special global memory buffers. The latest intercept data is required, however, so no count limit is imposed on the environment. The buffer size in global memory is defined by the "MAX" value of the counter. The counter does not count to MAX and stop as in most other OP Code selections, but starts over again at zero when MAX is reached. Thus, the counter counts modulo MAX+1. At the end of the sampling interval the count value may be read by the processors to determine the position of the last intercept in global memory. The processor must examine the intercepts backwards in memory to determine the age of the intercepts.

An alternate approach would be to send an interrupt to the ECM processor when the ECM buffer was half full, and again when the buffer is full. This would allow a double-buffer configuration and ECM flagged intercepts could be processed on a buffer-by-buffer basis instead of waiting for the end of a sample interval.

OP Code 4: The intercept is designed for the AP, but is routed through the global memory first. Format 2 is used here and the storage is formed as shown in FIG. 5-19. If the intercept is to be replicated, a 10-bit link field is given that is used to access the AM again at (01, REP-LINK). The data found at this location is also Format 2. If REP-LINK is zero there is no replication.

OP Code 5: Similar to OP Code 3. The intercept data is again sent to the POSP using Format 3. If the results are negative throughout the Link, the intercept is sent to the AP using Format 4.

Environment Counter

Figure 15:
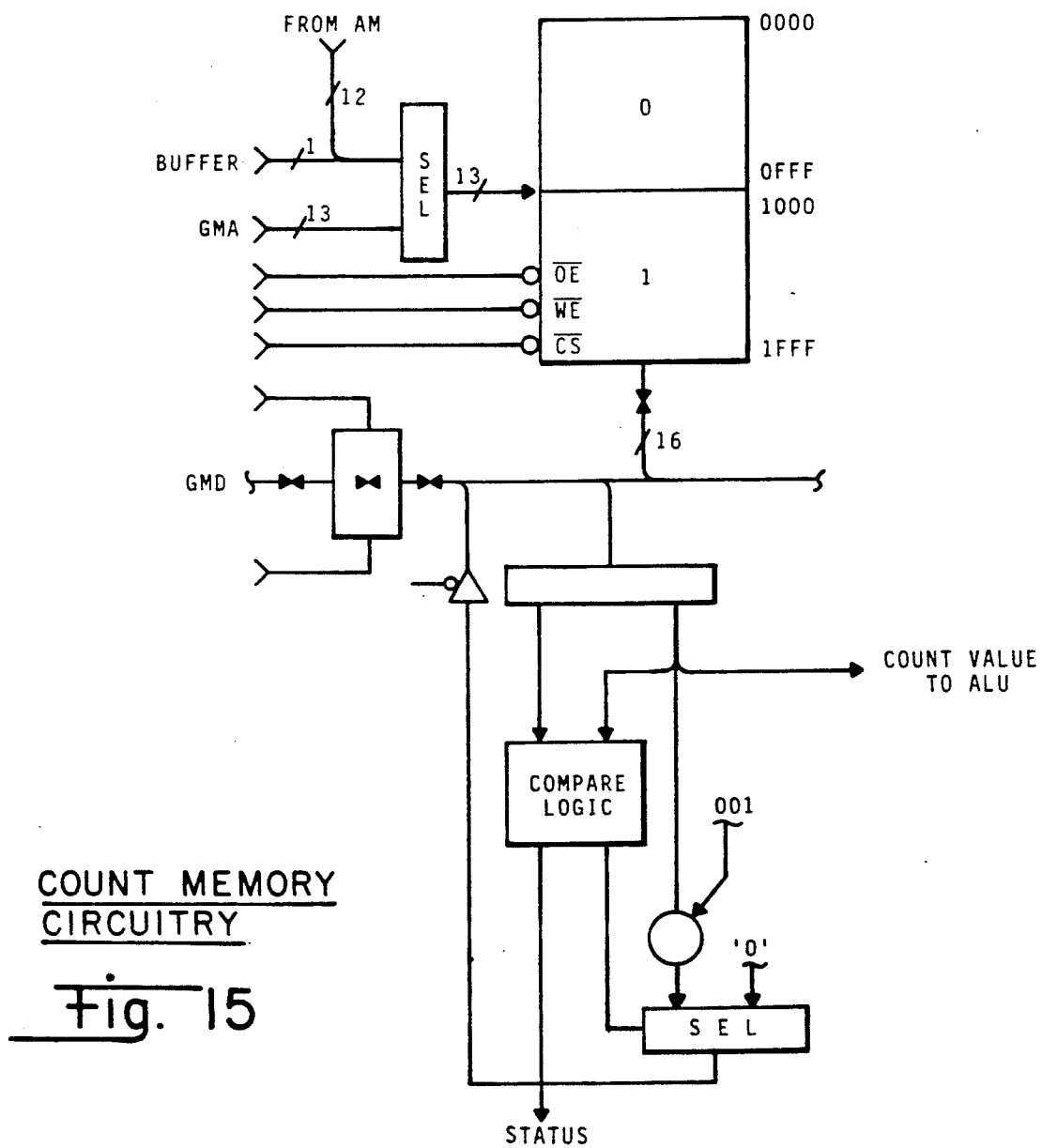
FIG. 15 is a diagram showing count memory circuitry.

Each intercept arriving at the assignment memory 714 goes to a count memory 722 is counted using a counter defined by the first 12 bits of the AM. The counters operate in two modes. The first mode is as a limiting counter and the second as a modulo n counter. The count memory format is shown in FIG. 9. The count memory requirement is 4K×16 bits and 8K×16 is provided. This double buffering is useful as it allows the analysis of the last scans counted while the current environment is being counted. It also allows the update of counters to be performed on the other buffer while intercept data is being handled in the S&A logic. FIG. 15 is a block diagram of the count memory logic.

It is understood that certain modifications to the invention as described may be made, as might occur to one with skill in the field of the invention, within the scope of the appended claims. Therefore, all embodiments contemplated hereunder which achieve the objects of the present invention nave not been shown in complete detail. Other embodiments may be developed without departing from the scope of the appended claims.

What is claimed is:

1. A data distribution network (DDN) which improves processing throughputs (eight million bytes per second) whenever high data rates of unsorted data are supplied to a processing system input via a 64-bit line, wherein said data distribution network includes coarse steering logic, fine steering logic, and assignment logic for partially sorting and filtering data so that subsequent analysis procedures can find the data in a more orderly form, combining synthetic (hash) addresses with look-up tables;

wherein the course steering logic comprises a first course selector unit for selecting data either from said processing system input or from a global memory via a global memory interface unit, with data organized into input words, coarse hashing means coupled to receive data from the first course selector unit, using 14 of the 64 available input bits of each input word to decide to which of 16,384 (16K) bins the intercept belongs, means for reducing the 16K bins to 1K bins comprising a second course selector unit for selecting data either from said course hashing means or from the global memory via the global memory interface unit, the output of the second course selector unit being coupled to a course selector memory, and the output of the course selector memory being coupled for input to the fine steering logic, and also to the global memory via the global memory interface unit;

wherein the fine steering logic includes first and second fine hashing means, each coupled to receive data from the course selector memory and also from the first course selector unit, for accepting the reduced classification output from the coarse steering memory and adding to it some more raw data from the input word, a first fine selector unit coupled between the first fine hashing means and a first fine steering memory, and a second fine selector unit coupled between the second fine hashing means and a second fine steering memory, so that the fine steering logic actually performs two sorts on the itercept and uses the result of one sort to decide which of the two sort outputs will be used, with the final sort output containing a class number of the input words and the operation that will be performed in the assignment logic;

wherein the assignment logic includes means for producing the address of the final storage location for the input word in one of the input word's possible destinations, and also means for providing an environment filter that cuts off further processing of the signal if a count within a given class of intercepts has exceeded a programmable upper limit.

2. A data distribution network (DDN) which improves processing throughputs whenever high data rates of unsorted data are supplied to a processing system input via a N-bit line, wherein said data distribution network includes coarse steering logic, fine steering logic, and assignment logic for partially sorting and filtering data so that subsequent analysis procedures can find the data in a more orderly form, combining synthetic (hash) addresses with look-up tables;

wherein the course steering logic comprises a first course selector unit for selecting data either from said processing system input or from a global memory via a global memory interface unit, with data organized into input words, coarse hashing means coupled to receive data from the first course selector unit, using M of the N available input bits of each input word to decide to which of $2^M$ bins the intercept belongs, means for reducing the $2^M$ bins to L bins comprising a second course selector unit for selecting data either from said course hashing means or from the global memory via the global memory interface unit, the output of the second course selector unit being coupled to a course selector memory, and the output of the course selector memory being coupled for input to the fine steering logic, and also to the global memory via the global memory interface unit;

wherein the fine steering logic includes first and second fine hashing means, each coupled to receive data from the course selector memory and also from the first course selector unit, for accepting the reduced classification output from the coarse steering memory and adding to it some more raw data from the input word, a first fine selector unit coupled between the first fine hashing means and a first fine steering memory, and a second fine selector unit coupled between the second fine hashing means and a second fine steering memory, so that the fine steering logic actually performs two sorts on the itercept and uses the result of one sort to decide which of the two sort outputs will be used, with the final sort output containing a class number of the input words and the operation that will be performed in the assignment logic;

wherein the assignment logic includes means for producing the address of the final storage location for the input word in one of the input word's possible destinations, and also means for providing an environment filter that cuts off further processing of the signal if a count within a given class of intercepts has exceeded a programmable upper limit.

* * * * *